United States Patent [19]

Gajajiva

[11] 4,022,966
[45] May 10, 1977

[54] GROUND CONNECTOR

[75] Inventor: Padej Gajajiva, Elmhurst, N.Y.

[73] Assignee: I-T-E Imperial Corporation EFCOR Division, East Farmingdale, N.Y.

[22] Filed: June 16, 1976

[21] Appl. No.: 696,546

[52] U.S. Cl. .............................. 174/65 SS; 174/78; 339/14 R
[51] Int. Cl.² ........................................ H02G 3/06
[58] Field of Search .................. 174/65 SS, 78, 51; 339/14 R, 14 L

[56] References Cited
UNITED STATES PATENTS

| | | | |
|---|---|---|---|
| 2,816,949 | 12/1957 | Curtiss | 174/65 SS |
| 2,821,567 | 1/1958 | Bergan | 174/65 SS |
| 3,006,664 | 10/1961 | Appleton et al. | 174/65 SS |
| 3,448,430 | 6/1969 | Kelly | 174/78 X |
| 3,567,843 | 3/1971 | Collins | 174/51 |
| 3,897,125 | 7/1975 | Anderson | 339/14 L |

Primary Examiner—J. V. Truhe
Assistant Examiner—D. A. Tone
Attorney, Agent, or Firm—Friedman, Goodman & Teitelbaum

[57] ABSTRACT

A ground connector for a jacketed, interlocked armored cable includes a body portion, a resilient grommet, a frictional washer and a compression nut. A longitudinally split metallic grounding ring is also provided. A first end of the grounding ring is seated in a bore formed interiorly of the body portion. The opposite second end of the grounding ring is provided with a plurality of fingers as well as generally U-shaped connecting sections for joining the fingers to the second end of the cylindrical wall of the grounding ring. The connecting sections and the fingers are both deflectable upon assembly of the connector. The fingers, which are initially at an angle with respect to the longitudinal axis of the connector, point in the same direction as the direction of cable assembly. The free ends of the fingers act like barbs to thereby minimize retraction of the cable.

10 Claims, 3 Drawing Figures

GROUND CONNECTOR

BACKGROUND OF THE INVENTION

This invention relates generally to connectors or the like and more particularly to an improved grounding connector for achieving a watertight connection between a jacketed, interlocked armored cable and a junction box or the like.

One example of the prior art in the general field to which the present invention is directed, is disclosed in U.S. Pat. No. 3,567,843 granted to K. M. Collins, et al. on Mar. 2, 1971. The Collins et al structure provides a body member having a first threaded portion that is adapted to be connected to a junction box, an internal conical bore and a second threaded portion that is arranged to receive a compression nut. A resilient grommet having a cylindrical bore that is approximately equal to the outside diameter of the cable and a conical outer surface that is complementary to the conical bore in the body member is inserted in the body member. A plurality of grounding stirrups are crimped to the grommet so that a portion thereof is in contact with the body member and simultaneously in contact with the metallic armor of the cable. While the Collins et al patent does disclose effective structure, is also exhibits several serious drawbacks. First of all there is the necessity of performing additional operations in order to crimp the stirrups to the grommet. Furthermore, the stirrups are internal and not visually accessible, should they be inadvertently omitted such error will not be perceived readily and will therefore be an absence of electrical grounding. Furthermore, the Collins et al patent relies on the compression force of the nut and, while this is usually effective, it is unpredictable. If the nut is not sufficiently tightened, the Collins et al structure will not provide efficient grounding.

Still another example of the prior art is disclosed in U.S. Pat. No. 2,816,949, granted on Dec. 17, 1957 to L. M. Curtiss. The Curtiss patent discloses an electric fitting for effecting a grounded, water tight connection between an outlet box and a metal jacketed cable connector. There is provided a tubular connector having externally threaded opposite end portions including a flange therebetween. The externally threaded portion is adapted to be secured in an opening in one wall of an outlet box by means of a lock nut that is threaded on one of the end portions. The opposite end portion of the tubular connector is provided with a counterbore that terminates in an inclined shoulder. A gland-nut is threaded on the opposite end portion of the tubular connector and is provided with an internal flange at its outer end that defines an annular shoulder presenting an opening substantially larger than the size of the cable. A resilient, rubber-like bushing having tapered opposite ends is seated at one end on the inclined shoulder and a spring metal disk of frusto-conical configuration in cross section and having a flange about its base end in the plane thereof is seated on the opposite end of the bushing with the flange being crimped between the bushing in the annular shoulder within the gland-nut whereby the bushing is shielded against exposure. A disk is provided centrally thereof with spaced openings formed on a radius corresponding substantially to that of the cable to define individual, aligned fingers that are integral with and in the plane thereof whereby when a cable is inserted through the disk and the bushing into the tubular connector, the cable is supported centrally of the tubular connector and the fingers are bent out of the plane of the disk into intimate contact with the cable to establish a ground connection through the outlet box.

The structure taught by the Curtiss patent, like the Collins et al structure is internal and is not readily visible to determine whether good electrical ground has been effected or whether or not the disk has, in fact, been put into place at all. In addition, the Curtiss structure also suffers the defect of having to rely on the compressive force of the gland-nut when it is threaded on the tubular connector in order to compress the bushing. Should the gland-nut become loose or should it not be tightened properly initially, it is quite likely that an ineffective ground connection will result.

Still another example of the prior art to which the present invention is directed is shown in U.S. Pat. No. 3,448,430, granted on June 3, 1969 to W. E. Kelly. In the Kelly Patent, there is disclosed a longitudinally split grounding ring having a plurality of outwardly angled fingers at one end thereof. The other end of the grounding ring is provided with a single piercing tooth that extends rearwardly or in a direction that is opposite to the direction of insertion of the cable. When a jacketed cable is used with the Kelly structure, the finger is inserted between the armor of the cable and the plastic jacket thereabout. The piercing tooth, in combination with the wall of the grounding ring is generally U-shaped and is arranged to receive between the legs thereof a resilient grommet with the juncture between the piercing tooth and the wall of the grounding ring serving as a stop for the plastic jacket of the cable and the grommet. In the assembled condition of the Kelly structure, the grommet is utilized for forcing the piercing tooth against the armor of the cable and to force the plurality of fingers against the connector body. As noted in the Kelly patent, the structure thereof may also be used without jacketing on the armored cable. In such a use, the piercing tooth is positioned within the bore of the grommet. However, the remaining structure and function is substantially the same as when the cable is jacketed.

It will be evident from a reading of the Kelly patent that effective grounding is achieved utilizing the compressive force of the grommet, a retaining ring and a gland-nut. It is particularly important to note that with the Kelly structure that grommet must exert a direct force on the ground ring in order to provide effective electrical grounding.

SUMMARY OF THE INVENTION

The present invention, in its broadest aspect, provides a grounding ring that is particularly adapted for use with a jacketed armored cable. The grounding ring has a wall that is at least partially circumferential and which extends in an axial direction in order to define first and second ends. A plurality of generally U-shaped members are formed integrally with a first end of the wall of the grounding ring and, where a plurality of U-shaped members are employed, such one is provided with an elongated finger that extends in the same direction as the direction of cable insertion. The end of the wall of the grounding ring opposite the U-shaped connecting members is flat and is seated on a transverse face formed within the connector body.

While there may be some superficial resemblance between the structure of the present invention and that disclosed in the Kelly patent, it will be appreciated that at least one important functional and structural distinction of the present invention over the Kelly structure resides in the fact that in the present invention the grounding ring is completely devoid of any contact with the grommet. That is, in the assembled condition, the grommet is utilized solely for the purpose of providing a seal and is axially spaced apart from the grounding ring. The fingers of the grounding ring, according to the present invention, are initially formed at an angle with respect to the longitudinal axis of the grounding ring. When the cable is inserted into the body portion of the connector, the armored surface of the cable engages and deflects in an outward direction the resilient fingers of the grounding ring. It should be further noted that in the assembled condition, the second end of the fingers may engage the armored surface of the cable and may bite into the cable to thereby inhibit inadvertent disassembly of the cable.

Accordingly, it is an object of the present invention to provide an improved grounding connector of the jacketed, armored cables.

It is another object of the present invention to provide an improved grounding ring for a jacketed armored cable.

Still another object of the present invention is to provide an improved grounding ring for a jacketed, armored cable, as described above, wherein an effective electrical ground is achieved without relying on the compressive force of a grommet.

Still another object of the present invention is to provide an improved grounding ring for a jacketed, armored cable, as described above, wherein the resilient fingers of the grounding ring extend in the same direction as the direction of cable insertion.

Yet another object of the present invention is to provide an improved connector for a jacketed, armored cable, as described above, wherein the body portion of the connector is provided with a transverse seat that is arranged to receive the flat end of a grounding ring.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENT

Figure 1:
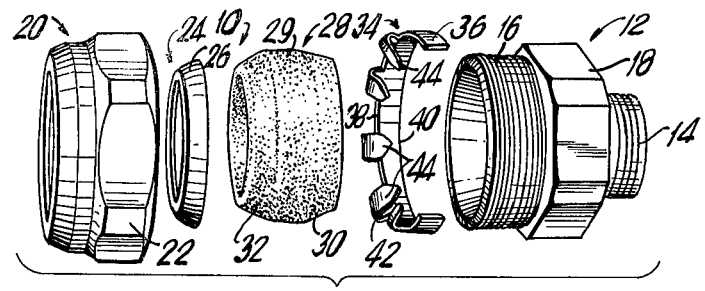
FIG. 1 is an exploded, perspective view illustrating the components comprising the present invention.

Referring now to the drawing, and in particular to FIG. 1, there will be seen a grounding connector 10 comprising the present invention. The grounding connector 10 includes a metallic body portion 12 including a first set of external threads 14 at one end thereof that are adapted for engagement with a utilization device such as a junction box or the like. The opposite end of the body portion 12 is also provided with a second set of external threads 16. The central section of the body portion 12 is provided with a plurality of flats, for example in the shape of a hexagon 18, in order to permit rotation of the body portion 12 with a suitable tool. A compression nut 20 having a plurality of flats 22 formed on the outside surface thereof is also provided with the flats 22 being in the shape of a hexagon, for example, in order to permit rotation of the compression nut 20 by means of a conventional tool. A cup-shaped friction washer 24 is provided with a generally conical outer surface 26. A resilient grommet, generally designated by the reference character 28, having a generally cylindrical outer central section 29 and first and second generally conical outer ends 30 and 32 respectively, is also included.

Figure 2:
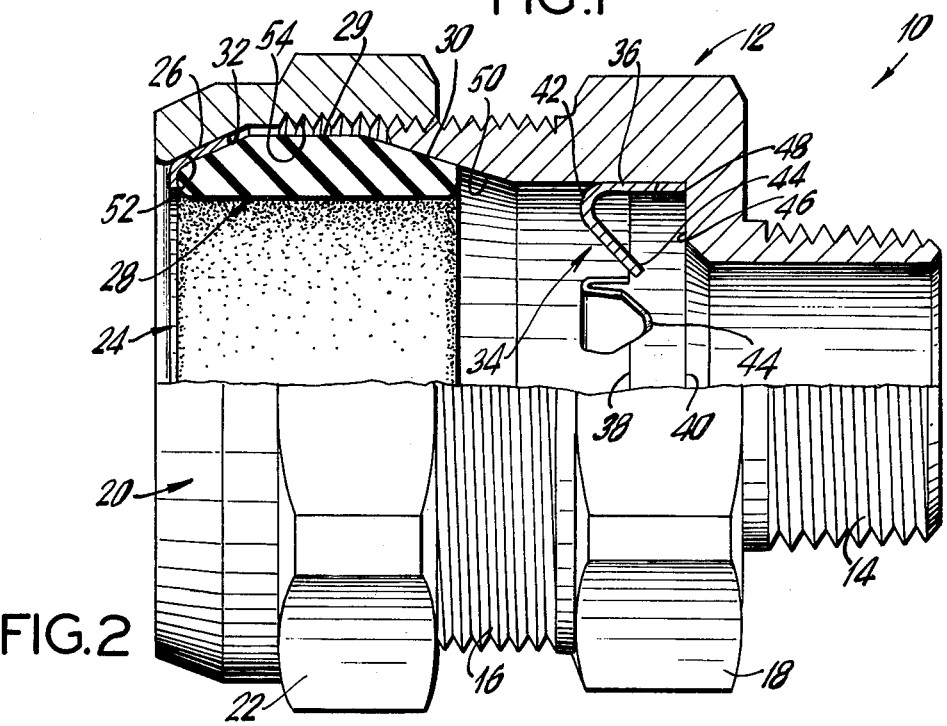
FIG. 2 is a longitudinal view, partially in section, illustrating the initial assembly of the grounding connector comprising the present invention without a cable inserted therein.

A resilient, metallic grounding ring 34 comprising a portion of the present invention includes a partially circumferential, axially extending wall 36 having first and second axially spaced apart transverse ends 38 and 40, respectively. As best shown in FIG. 2 and in FIG. 3, there are a plurality of resilient, generally U-shaped connecting members 42 having one leg thereof formed integrally with the end 38 of the wall 36. A resilient finger 44 is formed integrally at one end thereof with the other leg of each U-shaped connecting member 42.

Turning now specifically to FIG. 2, it will be seen that the connector body portion 12 is provided with a transverse, internal seat 46 against which the second end 40 of the grounding ring wall 36 is positioned. The end 40 is substantially flat so that the wall 36 of the grounding ring 34 bears against a longitudinally extending bore 48 formed internally of the connector body 12. It should also be noted that the fingers 44 are initially formed at an angle with respect to the longitudinal axis of the connector ring 34.

Still referring to FIG. 2, it will be noted that the connector body 12 is also provided with a conical bore 50 at the end thereof that is adjacent the threads 16. The conical bore 50 is arranged to receive the conical outer surface 30 of the resilient grommet 28. The compression nut 20, with the conical surface 26 of the friction washer 24 bearing against a conical bore 52 is then initially mounted on the connector body 12 using the mating engagement of the threads 16 on the connector body 12 and internal threads 54 formed on the compression nut 20. It should be noted at this time that the longitudinally split grounding 34 is resilient and initially has an outer diameter, as shown in FIG. 1, that is larger than the bore 48 in the connector body 12. The grounding ring 34, when its outer diameter is reduced for insertion into the connector body 12, will normally tend to spring outwardly and thereby be held within the connector body 12, where the final inserted diameter of the grounding ring 34 is substantially the same size as the bore 48.

Figure 3:
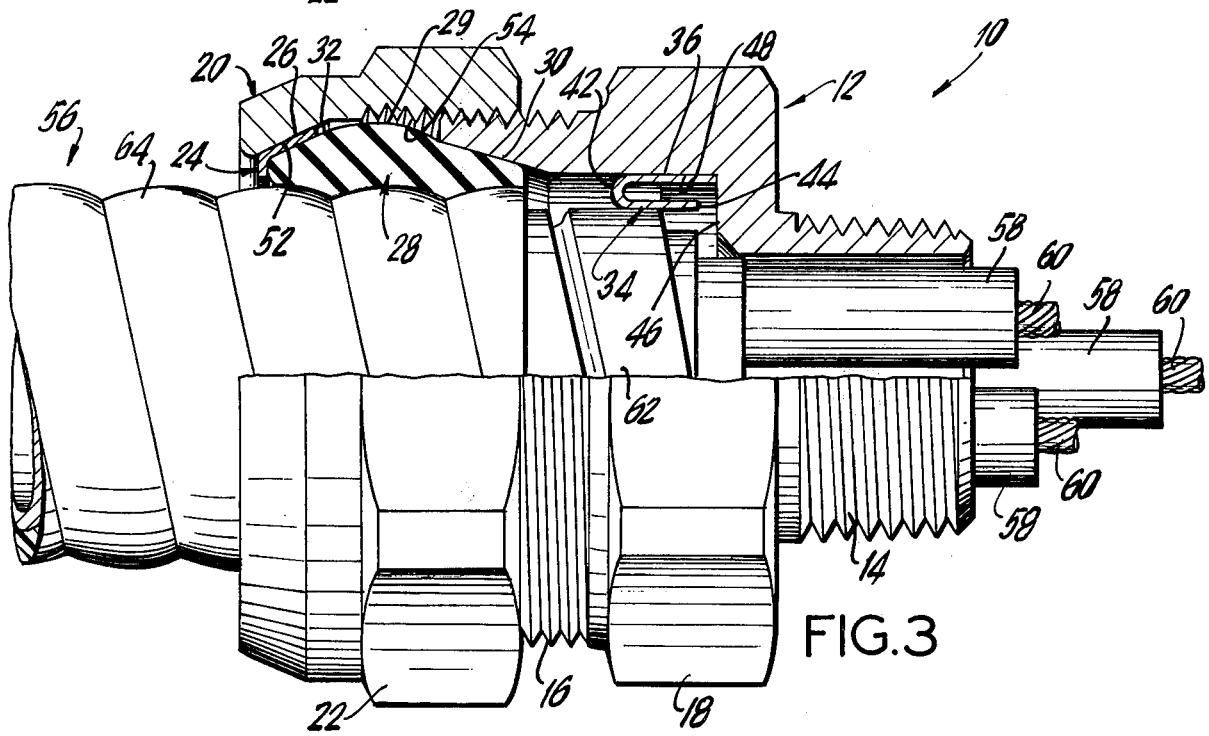
FIG. 3 is a longitudinal elevational view, partially in section, illustrating the structure comprising the present invention with a jacketed, armored cable, assembled thereto.

In order to complete the assembly, an armored cable, generally designated by the reference character 56, is inserted into the connector 10 from the end thereof defined by the compression nut 22. The armored cable 56 may be comprised of one or more individual cables 58 each having its own conductor 60. A metallic jacket or outer shell 62 is formed about the conductors 58 and is, in turn, encapsulated in a plastic jacket 64. Just prior to assembly, a portion of the plastic jacket 64, for example, approximately ½ inch, is removed in order to expose the metallic armor 62. The cable 56 is then inserted as shown in FIG. 3 and then the compression nut 20 is further tightened so that the inside bore of the grommet 28 conforms to the outside surface of the plastic jacket 64 in order to provide a water tight seal. It will be noted at this time that the tightening of the compression nut 20 causes the friction washer 24 to compress the rear or left hand portion of the grommet 28, as seen in FIG. 3 while the conical bore 50 of the connector body 12 compresses the right hand portion of the grommet 28. It should also be noted at this time that the grommet 28 is axially spaced from and does not touch the grounding ring 34.

The construction of the present invention provides a grounding connector that allows a metal, jacketed cable to be installed without the disassembling of the grounding connector and thereby overcomes an important objection that is prevalent with prior art constructions. Electrical grounding continuity is positive with the present invention and conforms to the requirements of various agencies such as CSA and UL. A watertight seal is developed when the compression nut is tightened on the connector body thereby compressing the grommet into the taper of the connector body. In addition, the construction of the grommet about the cable also holds the cable against an outward pulling force.

When the cable is inserted, the armor 62 thereof deflects the fingers 44 of the grounding ring, where each finger 44 is individually deflected and has no association with the deflection on any other finger. A force is exerted by the grounding ring 34 against both the armor of the cable and the inside wall of the connector body assuring good electrical contact at these points. The armor of the cable is also captured, in a limited sense, by these fingers 44 since the free end of the fingers point in the same direction as cable insertion and therefore act like barbs to inhibit the inadvertent disassembly of the cable to the left.

The material used for the grounding ring may be non-magnetic grade of stainless steel in order to reduce the heating effect produced by induction when only a single conductor power cable (carrying high current) is used in the connector. In this case, the connector body itself would also be made of a non-magnetic material. The present invention as described hereinabove, substantially reduces the cost of manufacturing and assembly.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A grounding connector for coupling a jacketed, armored cable to a utilization device such as a junction box, said connector comprising the combination of a metallic body portion having first and second external threads at opposite ends thereof, respectively, for engagement by said first threads with the utilization device, a resilient grommet having at least a portion thereof positioned within said body portion and arranged to bear against an outside surface of the cable in an assembled condition, a compression nut arranged to mate with said second threads on said body portion to thereby exert a force on said grommet whereby said grommet is compressed between said body portion and the outside surface of the cable, and a metallic grounding ring disposed within said body portion, said grounding ring having at least a partially circumferential, axially extending side wall defined by first and second ends, said grounding ring further including at least one elongated finger integral with said grounding ring side wall proximate said first end thereof, one end of said finger pointing in a direction of the body portion end having said first threads, said direction being the direction of cable insertion, said side wall of said grounding ring being in contact with said body portion, whereby, in the assembled condition, said finger is in contact with the armor of the cable.

2. A connector according to claim 1, wherein there is a plurality of said finger, said fingers being angularly spaced apart from each other.

3. A connector according to claim 2, wherein said fingers are initially disposed at an angle with respect to the longitudinal axis of said grounding ring prior to being engaged by the armor of the cable.

4. A connector according to claim 1, wherein said one end of said finger is arranged to engage the outer surface of the armor of the cable for inhibiting the disassembly thereof.

5. A connector according to claim 1, wherein said grounding ring includes a U-shaped member having a first leg thereof integral with said first end of said grounding ring side wall and having a second leg thereof integral with said finger.

6. A connector according to claim 1, wherein said body portion includes an internal, transverse seat and wherein said second end of said grounding ring side wall is positioned against said seat in the assembled condition.

7. A connector according to claim 6, wherein said second end of said grounding ring side wall is flat.

8. A connector according to claim 1, wherein there is further included a friction washer positioned intermediate a portion of said grommet and said compression nut.

9. A connector according to claim 8, wherein said friction washer is conical and is positioned between a conical surface at one end of said grommet and a conical bore in said compression nut.

10. A connector according to claim 1, wherein said grounding ring is split across said side wall from said first end to said second end.

* * * * *